(12) United States Patent
Feyereisen et al.

(10) Patent No.: US 10,214,300 B2
(45) Date of Patent: Feb. 26, 2019

(54) SYSTEM AND METHOD FOR DISPLAYING RUNWAY OVERRUN INFORMATION

(71) Applicant: HONEYWELL INTERNATIONAL INC., Morris Plains, NJ (US)

(72) Inventors: Thea L Feyereisen, Hudson, WI (US); Mark Giddings, Mesa, AZ (US); Gang He, Morristown, NJ (US); Steve Johnson, North Bend, WA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 43 days.

(21) Appl. No.: 15/348,637

(22) Filed: Nov. 10, 2016

(65) Prior Publication Data

US 2018/0127111 A1 May 10, 2018

(51) Int. Cl.
| | | |
|---|---|---|
| *B64D 45/08* | (2006.01) | |
| *G08G 5/02* | (2006.01) | |
| *B64C 25/42* | (2006.01) | |
| *G08G 5/06* | (2006.01) | |
| *B64D 45/04* | (2006.01) | |
| *G01C 23/00* | (2006.01) | |

(52) U.S. Cl.
CPC .............. *B64D 45/08* (2013.01); *B64C 25/42* (2013.01); *B64D 45/04* (2013.01); *G01C 23/00* (2013.01); *G01C 23/005* (2013.01); *G08G 5/025* (2013.01); *G08G 5/065* (2013.01)

(58) Field of Classification Search
CPC .......... G08G 5/02; G08G 5/025; B65D 43/00; B65D 45/04; B65D 45/08; B60T 8/1703; B64C 25/426; G01C 23/005; G05D 1/0083; B64F 1/18; B64D 43/00; B64D 45/04; B64D 45/08
See application file for complete search history.

(56) References Cited

U.S. PATENT DOCUMENTS

| | | | | |
|---|---|---|---|---|
| 4,638,437 A | * | 1/1987 | Cleary | ................. G05D 1/0083 340/959 |
| 4,843,554 A | * | 6/1989 | Middleton | ........... G05D 1/0083 701/15 |

(Continued)

FOREIGN PATENT DOCUMENTS

| | | | | |
|---|---|---|---|---|
| FR | 3049265 A1 | * | 9/2017 | |
| WO | WO-2007006310 A2 | * | 1/2007 | ............. B60K 37/02 |

OTHER PUBLICATIONS

EPO machine translation of FR 3049265 (original FR document published Sep. 29, 2017) (Year: 2017).*

(Continued)

*Primary Examiner* — Behrang Badii
*Assistant Examiner* — David A Testardi
(74) *Attorney, Agent, or Firm* — Lorenz & Kopf, LLP (57) ABSTRACT

A system and method are provided that improve upon existing aircraft display systems by generating and updating an overrun image that may be overlaid on a variety of panoramic and landscape images on a display device. The overrun image displays stopping locations for all relevant available stopping devices, as determined from the far end of the selected runway. In addition, the aircraft display system determines an advisory zone on the selected runway and presents limited symbols and images in and near the advisory zone that indicate distances and relevant information.

8 Claims, 7 Drawing Sheets

(56) References Cited

U.S. PATENT DOCUMENTS

| | | | | |
|---|---|---|---|---|
| 5,047,942 | A * | 9/1991 | Middleton | G05D 1/0083 701/15 |
| 5,353,022 | A * | 10/1994 | Middleton | G05D 1/0083 340/959 |
| 7,916,042 | B2 | 3/2011 | Constans | |
| 9,008,873 | B1 | 4/2015 | Phillips et al. | |
| 9,082,301 | B2 | 7/2015 | Catalfamo et al. | |
| 9,221,554 | B2 | 12/2015 | Horne et al. | |
| 9,245,450 | B1 * | 1/2016 | Chiew | G05D 1/0676 |
| 9,399,524 | B2 | 7/2016 | He et al. | |
| 9,552,737 | B1 * | 1/2017 | Theriault | G01C 23/005 |
| 2005/0006524 | A1 * | 1/2005 | Villaume | G05D 1/0083 244/111 |
| 2007/0208466 | A1 * | 9/2007 | Meunier | B64C 25/426 701/16 |
| 2008/0012729 | A1 * | 1/2008 | Constans | G05D 1/0083 340/973 |
| 2008/0162092 | A1 * | 7/2008 | Coulmeau | G05D 1/0676 703/2 |
| 2008/0249675 | A1 * | 10/2008 | Goodman | B64C 25/426 701/16 |
| 2009/0045982 | A1 * | 2/2009 | Caillaud | G01C 21/00 340/972 |
| 2009/0125168 | A1 * | 5/2009 | Voisin | G05D 1/0083 701/15 |
| 2010/0036552 | A1 * | 2/2010 | Pepitone | G05D 1/0676 701/18 |
| 2013/0127642 | A1 * | 5/2013 | Maggiore | G08G 5/0008 340/947 |
| 2013/0271300 | A1 * | 10/2013 | Pepitone | G01C 23/005 340/972 |
| 2014/0225753 | A1 * | 8/2014 | Conrardy | G08G 5/0047 340/972 |
| 2014/0257601 | A1 * | 9/2014 | Horne | B64D 45/00 701/16 |
| 2015/0120098 | A1 * | 4/2015 | Catalfamo | G08G 5/02 701/16 |
| 2015/0302753 | A1 * | 10/2015 | Henderson | G08G 5/02 701/18 |
| 2016/0090193 | A1 * | 3/2016 | He | B64D 45/04 340/971 |
| 2016/0107766 | A1 * | 4/2016 | He | B64D 45/08 701/7 |
| 2016/0200451 | A1 * | 7/2016 | Wang | B64D 45/04 701/16 |
| 2017/0088284 | A1 * | 3/2017 | Holder | B64D 45/00 |
| 2017/0275020 | A1 * | 9/2017 | Charbonnier | B64D 45/08 |

OTHER PUBLICATIONS

Jacob, Armand et al., "The runway overrun prevention system", Safety First (magazine), #8, Jul. 2009, pp. 3-9 (Year: 2009).*
Wikipedia article, "Runway", Old revision dated Nov. 9, 2016, 10 pages (Year: 2016).*
"Runway Overrun Prevention System", SKYbrary Aviation Safety, http://www.skybrary.aero/index.php/Runway_Overrun_Prevention_System, printed on Oct. 2, 2016.
Extended EP Search Report for Application No. 17199611.9 dated Mar. 26, 2018.

* cited by examiner

SYSTEM AND METHOD FOR DISPLAYING RUNWAY OVERRUN INFORMATION

TECHNICAL FIELD

The present invention generally relates to a display system that provides runway landing information, and more particularly to an improved display system and method for providing runway overrun information.

BACKGROUND

Landing an aircraft on a runway can be very cognitively demanding. To perform the landing properly, the pilot must view and synthesize complex information provided by a variety of sources, and in a variety of mediums.

Visual information is often displayed in the form of a landscape or panoramic image, such as a navigation map, on a display device. The navigation map may have text, icons, and symbols overlaid on it. Depending on the current display scale settings and the approach, symbology representing the runway icon can be too small to provide additional, relevant, landing information, such as a predicted touch down point and a predicted stopping point. While some display systems address this concern by providing a dedicated runway display section on a navigation map, there is room for improvements that enhance a pilot's uptake of the relevant information reduce the cognitive load and increase the pilot's confidence when landing and making go-around decisions.

Improvements that further enhance a pilot's uptake of the relevant runway information are desirable. For example, in addition to presenting a stopping location representative of the aircraft's current configuration, a displayed image that presents stopping location information that is inclusive of all available stopping devices is desirable. In addition to displaying stopping locations of all available stopping devices, presenting the stopping location information as measured from a far end of the runway may be a more intuitive and unambiguous approach. The provided system and method realize these improvements. Furthermore, other desirable features and characteristics of the exemplary embodiments will become apparent from the subsequent detailed description.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In accordance with an exemplary embodiment, a display system for an aircraft is provided. The display system includes a computer that comprises a processor and a computer readable storage medium. The computer is configured to: receive, from a navigation system, an aircraft position and location; receive, from a sensor system, aircraft status data; determine, based on the aircraft status data, the aircraft position and location, and aircraft performance data (a) an aircraft energy state, and (b) a braking status of the aircraft; determine an advisory zone on the runway, the advisory zone defined as a length measured from the far end of the runway; and selectively, based on the braking status, determine at least one stopping location. The display system also includes a display device responsive to the computer and configured to: display symbology representing a runway segment comprising at least the advisory zone; render the advisory zone in a visually distinct manner with respect to a remainder of the runway segment; and representing for each stopping location of the at least one stopping location, overlay the runway segment with a unique symbol.

In accordance with another embodiment, another display system is provided. The display system includes a computer comprising a processor and a computer readable storage medium. The computer is configured to: receive, from a navigation system, an aircraft position and location; receive, from a sensor system, aircraft status data; determine an advisory zone on the runway; determine (a) an aircraft energy state, and (b) a braking status of the aircraft, based on the aircraft status data and the aircraft position and location; determine, based on the aircraft energy state and the aircraft braking status, (a) a manual braking stopping location, measured from the far end of the runway, and (b) a stopping location associated with the braking status of the aircraft, measured from the far end of the runway. The display system also includes a display device responsive to the computer and configured to: display, in a dedicated area of a displayed image, (i) symbology representing a selected runway, (ii) a first symbol indicating the manual braking stopping location, and a second symbol indicating the stopping location associated with the braking status of the aircraft, each overlaid on the runway, and (iii) a number of indicator symbols arranged at equally spaced intervals within the advisory zone, wherein the number is less than six.

In accordance with another embodiment, a method for a display system onboard an aircraft is provided. The method includes, at a computer, receiving, from a navigation system, an aircraft position and location; receiving, from a sensor system, aircraft status data; determining an advisory zone on the runway; determining (a) an aircraft energy state, and (b) a braking status of the aircraft, based on the aircraft status data and the aircraft position and location; determining, based on the aircraft energy state and the aircraft braking status, (a) a manual braking stopping location, measured from the far end of the runway, and (b) a stopping location associated with the braking status of the aircraft, measured from the far end of the runway. The method also includes displaying, on a display device, in a dedicated area of a displayed image, (i) symbology representing a selected runway, (ii) a first symbol indicating the manual braking stopping location, and a second symbol indicating the stopping location associated with the braking status of the aircraft, each overlaid on the runway, and (iii) a number of indicator symbols arranged at equally spaced intervals within the advisory zone, wherein the number is less than six.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention that is defined by the claims. Furthermore, there is no intention to be bound by any expressed or implied theory presented in the preceding technical field, background, brief summary, or the following detailed description.

Some embodiments may require more than one display device or monitor, such as a head down display screen. The display devices generate displayed images, such as a two dimensional moving map display, and/or a three dimensional perspective or synthetic vision display. The displayed image may include a top-down view of the aircraft, navigational information (such as the flight plan) and terrain information (such as the surrounding environment). In the provided exemplary displayed images, some details of the terrain and/or navigation information may be omitted for simplicity; however, it is to be understood that underlying topography and airport objects are additionally displayed as is known in the art. In addition, various symbols are utilized on the displays to denote navigational cues (e.g., waypoint symbols, line segments interconnecting the waypoint symbols, range rings), airport information, neighboring traffic, and nearby environmental features (e.g., terrain, weather conditions, and political boundaries).

As an overview, the embodiments described herein generally function as follows. After a selected landing runway is identified, a final segment of the selected runway is displayed in a two dimensional (2D) or a three dimensional (3D) "overrun image" overlaid in a dedicated area on an existing displayed image rendered on the display device. As used herein "existing displayed image" refers to a two dimensional (2D) or three dimensional (3D) landscape or panorama view displayed on the display device. The overrun image is displayed when the aircraft is in final approach and on the ground. The overrun image is removed from the existing displayed image otherwise. Within the overrun image, the runway segment is overlaid with intuitive symbology indicating various predicted stopping locations with distances measured from the far end of the runway. The predicted stopping locations are based on braking configurations.

Figure 1:
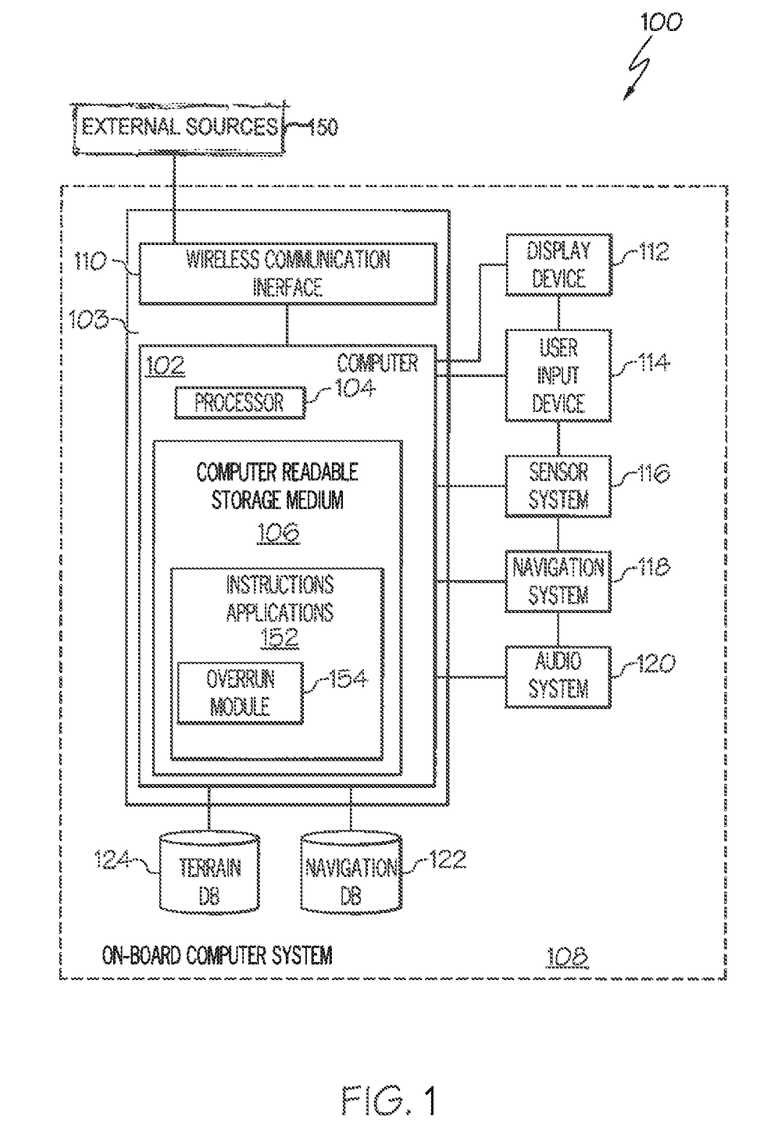
FIG. 1 is a functional block diagram of an aircraft display system for generating images, in accordance with exemplary embodiments.

Referring to FIG. 1, a functional diagram of an exemplary display system 100 is depicted, in accordance with various embodiments. The display system 100 includes a computer 102 that may be an integral part of an on-board computer system 108, and configured for operable communication with components of the on-board computer system 108. Non-limiting examples of the components of the on-board computer system 108 include: a wireless communication interface 110, a display device 112, a user input device 114, a sensor system 116, a navigation system 118, an audio system 120, a navigation database 122, and a terrain database 124. External sources 150 may be in operable communication with the computer 102, via the wireless communication interface 110. In some embodiments, the computer 102 is integrated with the wireless communication interface 110, as shown by block 103. These functional blocks are described in detail below.

The computer 102 includes at least one computer processor 104 that is in communication with a tangible, non-transitory computer-readable storage medium 106 by way of a communication bus or other such computing infrastructure. The processor 104 is illustrated in one block, but may include various different processors and/or integrated circuits that collectively implement any of the functionality described herein. The processor 104 includes a central processing unit (CPU) that is in communication with the computer readable storage medium 106. An I/O interface (not illustrated) may be any entry/exit device adapted to control and synchronize the flow of data into and out of the CPU from and to peripheral devices such as input/output devices used to interface with other functional blocks within the on-board computer system 108.

The computer readable storage medium 106 can include any known form of computer-usable or computer-readable (storage) medium. The computer-readable (storage) medium of computer readable storage medium 106 can be any type of memory technology including any types of read-only memory or random access memory or any combination thereof. This encompasses a wide variety of media that include, for example but not limited to, an electronic, magnetic, optical, electromagnetic, infrared, or semiconductor system, apparatus, device, or propagation medium. Some non-limiting examples can include, for example, volatile media, non-volatile media, removable media, and non-removable media. The term computer-readable medium and variants thereof, as used in the specification and claims, refer to any known computer storage media. In some embodiments, storage media includes volatile and/or non-volatile, removable, and/or non-removable media. For example, storage media could include any of random-access memory (RAM), read-only memory (ROM), electrically erasable programmable read-only memory (EEPROM), solid state memory or other memory technology, CD ROM, DVD, other optical disk storage, magnetic tape, magnetic disk storage or other magnetic storage devices, and any other medium that can be used to store desired data. For sake of simplicity of illustration, the computer readable storage medium 106 is illustrated as a single block within computer 102; however, the computer readable storage medium 106 can be distributed throughout the on-board computer system 108, in any of the various blocks illustrated in FIG. 1, and can be implemented using any combination of fixed and/or removable storage devices depending on the implementation.

The computer readable storage medium 106 stores processor readable instructions 152. The processor readable instructions 152 can be distributed across or among one or more modules and applications stored in the computer readable storage medium 106. The processor readable instructions 152 may embody one or more programs or applications which can be loaded and executed by the processor 104. Within the processor readable instructions 152, the overrun module 154 includes program code and pre-defined rules for relations among various pieces of information, rules, and algorithms sufficient to perform the functions of a display system 100 as described herein. Specifically, performance of the steps of a method or process associated with the display system 100 includes executing the processor readable instructions embodied in the overrun module 154.

The user input device 114 may be any one, or combination, of various known user input device devices including, but not limited to, a touch sensitive screen, a cursor control device (CCD) (not shown), such as a mouse, a trackball, or joystick, and/or a keyboard, one or more buttons, switches, or knobs. In the depicted embodiment, the user input device 114 includes a CCD and a keyboard (not shown). A user provides input via the user input device 114. In some embodiments, the user input device 114 and display device 112 are integrated.

Data may be received by the computer 102, and processor 104, via wireless or wired communication. Wireless communication may include data from external sources 150, such as air traffic control (ATC), traffic information service and broadcast (TIS-B), automatic dependent surveillance broadcast (ADS-B), an aircraft communications addressing and reporting system (ACARS), a satellite, a source of Aviation Information Publication (AIP) data, and similar sources. Wireless communication may be received by the wireless communication interface 110, which includes at least one receiver and at least one transmitter that are operatively coupled to at least one processor such as the processor 104. The wireless communication interface 110 can enable the computer 102 to establish and maintain the wireless communications links to the external sources. The wireless communication interface 110 can perform signal processing (e.g., digitizing, data encoding, modulation, etc.) as is known in the art. As mentioned, in some embodiments, the wireless communication interface 110 is integrated with the computer 102, as shown by block 103.

Wired communication may include data from components in the on-board computer system. Specifically, aircraft status data may be received from the sensor system 116, which includes sensors and software sufficient for detecting and providing aircraft status data, and aircraft position and location data may be received from the navigation system 118, which includes sensors, devices, instruments (such as on-board radar, a radar altimeter, and a global positioning system (GPS)), and software, sufficient for detecting and providing the aircraft location and position, as well as for detecting and providing detected weather data. In addition, data may be received from aircraft databases, such as the navigation database 122 and the terrain database 124.

The terrain database 124 includes various types of data representative of the terrain over which the aircraft is flying, and the navigation database 122 includes various types of navigation-related data. More specifically, the terrain data includes environmental features data and elevation information used by the computer to render a display of the environment on the display device. The navigation data includes flight plan related data such as, for example, waypoints, distances between waypoints, headings between waypoints, airport data (such as layouts, dimensions, objects, aircraft approach information, and the like), navigational aids, obstructions, special use airspace, political boundaries, and communication frequencies. It will be appreciated that, although the terrain database 124 and the navigation database 122 are, for clarity and convenience, shown as separate and shown as stored separate from the computer 102, some or all of either of these databases 122, 124 could be loaded into the computer readable storage medium 106, or integrally formed with the processor 104. The terrain database 124 and navigation database 122 could also be part of a device or system that is physically separate from the on-board computer system 108.

The sensor system 116 may be implemented using various types of inertial sensors, systems, and or subsystems, now known or developed in the future, for detecting and supplying various types of aircraft status data. The sensor system 116 may additionally include line replaceable units (LRUs), transducers, accelerometers, instruments, and other well-known devices. The aircraft status data may vary, but preferably include data representative of the state of the aircraft such as, for example, aircraft speed, heading, altitude, and attitude, pitch, roll, and yaw. The sensor system may also detect aspects of aircraft status data (airspeed, altitude, vertical speed, remaining fuel, faults, conditions, thrust level, aircraft configuration, and detected weather and temperature). As used herein, the aircraft configuration comprises a position of: landing gear, speed brakes, and slats/flaps.

The navigation system 118 may include a multi-channel GPS receiver, with each channel tuned to receive one or more GPS broadcast signals transmitted by the constellation of GPS satellites (not illustrated) orbiting the earth. Each GPS satellite encircles the earth two times each day, and the orbits are arranged so that at least four satellites are always within line of sight from almost anywhere on the earth. A GPS receiver, upon receipt of the GPS broadcast signals from at least three, and preferably four, or more of the GPS satellites, determines the distance between the GPS receiver and the GPS satellites and the position of the GPS satellites. Based on these determinations, the navigation system 118 may, using a technique known as trilateration, determine, for example, aircraft position, groundspeed, and ground track angle. In some embodiments, navigation data is supplied by the navigation system 118 to the processor 104, from which the processor 104 may determine parameters such as aircraft glide slope deviation therefrom. In other embodiments, the navigation system 118 is configured to determine and supply parameters to the processor 104. In addition to GPS data, the navigation system 118 may provide time/date information, heading information, weather information, flight path data, track data, radar altitude data, geometric altitude data, wind speed data, wind direction data, and etc.

The display device 112, in response to commands from the processor 104, selectively renders textual, graphic, and/or iconic information, thereby supplying visual feedback, in the form of an existing displayed image, to a user. As described above, the existing displayed image may be a three dimensional synthetic vision image including terrain, objects, and airport features. It will be appreciated that the display device 112 may be implemented using any one of numerous known display devices suitable for rendering textual, graphic, and/or iconic information in a format viewable by a user. Non-limiting examples of such display devices include cathode ray tube (CRT) displays, and flat panel displays such as LCD (liquid crystal displays) and TFT (thin film transistor) displays. The display device 112 may be implemented as a panel mounted display, a HUD (head-up display), or as any one of numerous known display technologies. In the depicted embodiment, the display device 112 is configured as a primary flight display (PFD). However, the display device 112 may be configured as any one of numerous types of aircraft flight deck displays. For example, it may be configured as a multi-function display, a horizontal situation indicator, or a vertical situation indicator. In some embodiments, the display device 112 and audio system 120 are employed together to alert and direct the attention of a pilot or crew. Audio system 120 is configured to receive commands and data from the computer 102 (or 103) and the on-board computer system 108, and emit sounds and speech responsive thereto.

In operation, the processor 104 is configured to: receive, from the navigation system 118, an aircraft position and location, and receive, from the sensor system 116, aircraft status data. The processor 104 processes the aircraft status data and the aircraft position and location data from the navigation system 118 and the sensor system 116 to determine (a) an aircraft energy state, and (b) a braking status of the aircraft. The aircraft energy state is determined from a plurality of aircraft flight parameters received from the sensor system 116 and the navigation system 118. Aircraft flight parameters processed to determine aircraft energy state include airspeed, groundspeed, altitude above the runway, distance to the runway, aircraft configuration, and engine thrust settings. A braking status is defined as one configuration from the set including manual braking, auto-brake high (HI), auto-brake medium (MED), auto-brake LOW, and thrust reverser (TR) only.

Aircraft braking status is processed to selectively determine one or more stopping locations. Some braking status configurations include interactions that the computer 102 takes into account in the selective determination of stopping locations, such as: manual braking only occurs when the auto-brake is off; however, thrust reverser braking may be utilized in combination with manual braking; and, when auto-brake is high the maximum manual braking may not be determined or displayed.

Figure 2:
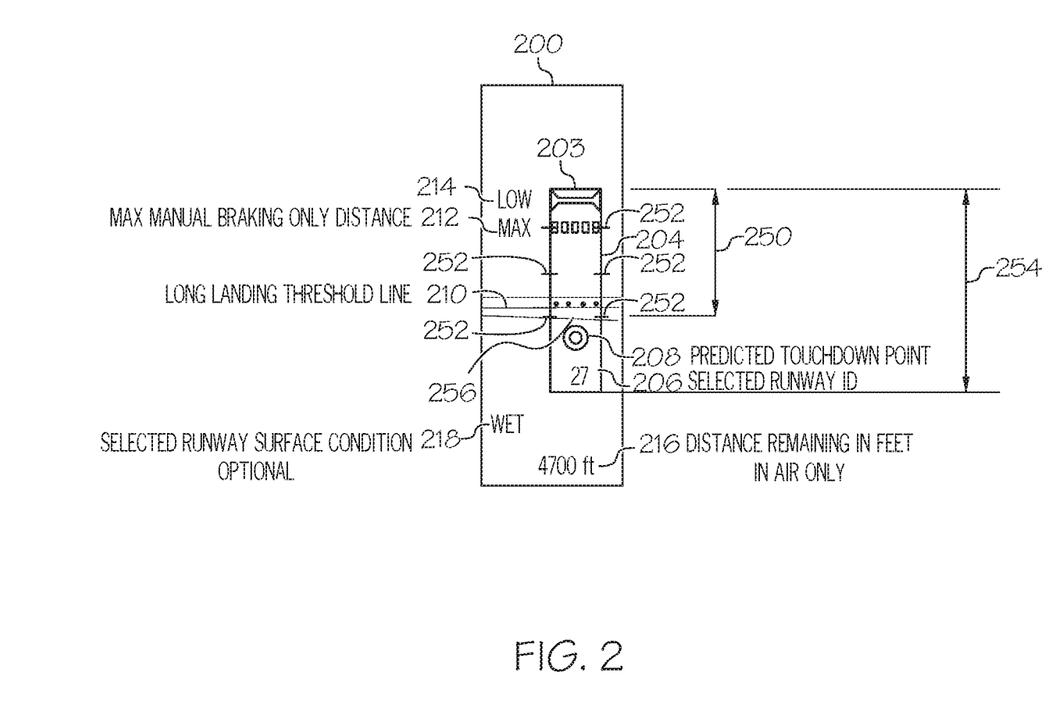
FIGS. 2-8 are exemplary runway overrun images for display on a display device, in accordance with an exemplary embodiment.

The processor 104 references airport data to obtain runway data such as dimensions, location, and orientation. From the runway data, the processor 104 identifies a far end (FIG. 2, 203) of the runway (FIG. 2, 204). As used herein, the "far end" of the runway is the opposite end of the runway from an entrance or landing end of the runway (i.e., the termination of the runway, before which an aircraft must be safely stopped). Upon identifying the far end of the runway, the processor 104 makes various distance determinations described herein measured from the far end. The processor 104 determines an advisory zone on the runway, the advisory zone defined as a predetermined length of the selected runway that is measured from the far end of the runway. The predetermined length used for the advisory zone may be a discrete number or a percentage of a total selected runway length, and may be received as a user input or a stored value retrieved from the computer readable storage medium; generally, the advisory zone is less than half of the total length of the runway, and preferably approximately the final third of the runway.

Aircraft performance data may incorporate data from the sensor system 116 and the navigation system 118, may be accumulated and/or processed over time, and may be stored in the computer readable storage medium 106. The processor 104 processes the aircraft energy state, the aircraft braking status, the aircraft position and location, and aircraft performance data, and selectively determines at least one from the set including (a) a manual braking stopping location, as a distance measured from the far end of the runway, (b) a stopping location associated with the braking status of the aircraft, measured as a distance from the far end of the runway, and (c) when the aircraft is on ground, a current deceleration stopping location, measured as a distance from the far end of the runway.

It should be understood that FIG. 1 is a simplified representation of a display system 100 for purposes of explanation and ease of description, and FIG. 1 is not intended to limit the application or scope of the subject matter in any way. In practice, the display system 100 and/or aircraft will include numerous other devices and components for providing additional functions and features, as will be appreciated by those with skill in the art.

Summarizing FIG. 1, the processor 104 is configured to, responsive to data from the sensor system 116, the navigation system 118, the terrain database 124 and the navigation database 122, process the data and supply appropriate commands to the display device 112 such that it may render and continually update the existing displayed image. In addition, the processor 104 is configured to process data from the sensor system 116, the navigation system 118, the terrain database 124 and the navigation database 122 to supply appropriate commands to the display device 112 such that it may display an overrun image having symbology representing a runway segment overlaid with relevant but intuitive symbols that may be utilized for final approach and landing. This functionality is described in more detail below.

FIGS. 2-7 are exemplary runway overrun images for display on a display device 112, in accordance with an exemplary embodiment. In each of the FIGS. 2-7, the same dedicated area of predetermined height and width is utilized by the computer 102 to generate the overrun image. The overrun image is then overlaid on an existing displayed image on the display device 112, as described herein.

Referring to FIG. 2, overrun image 200 is depicted. The selected runway 204 is identified based on user input and navigational and terrain data. The dimensions and orientation of the selected runway 204 are processed and the far end 203 of the selected runway 204 is identified. A rectangular symbol, having a length measured from the far end 203, represents a runway segment 254. The runway segment 254 may comprise the entire runway, however, when it comprises only a portion of the runway, the length of the runway segment 254 is measured from the far end 203. The runway identification 206 is displayed on a landing or entry side of the runway (the landing side being opposite the far end 203). In FIG. 2, the aircraft is in flight, and symbology depicting: a predicted touchdown point 208 (depicted as a doughnut), and a long landing threshold line 210 (depicted as a line of dots) is shown. In addition, a first symbol 212, indicating a maximum manual braking only location (depicted as a dashed line with the text "MAX" next to it), and a second symbol 214, indicating a stopping location associated with the braking status of the aircraft (in the example, braking status is autobrake low only, so an autobrake only stopping bar, depicted as a bar bell with the text "LOW" next to it) is shown. One with skill in the art will readily appreciate that the symbology employed for the above described representations is representative and is not limiting. Additional alphanumeric symbology displayed within the overrun image 200 to indicate additional information, such as a distance remaining 216 to the far end 203 of the runway 204 and surface condition 218.

The computer 102 determines an advisory zone 250 on the runway 204, the advisory zone 250 is defined as a final portion of the runway, and therefore the advisory zone 250 is an area of caution for the pilot or crew. The advisory zone 250 has a length measured from the far end 203 of the runway 204, extending toward the front or entry end of the runway 204. The length of the advisory zone 250 is less than half of the total length of the runway 204. An entry side 256 of the advisory zone 250 provides an intuitive visual indicator to a pilot or crew of the location of the aircraft (FIG. 3 304) with respect to the final portion of the runway 204.

In some embodiments, the advisory zone 250 is substantially 3000 feet, wherein "substantially" is defined as plus or minus ten percent.

To further assist a pilot or crew with quickly grasping the location and size of the advisory zone 250, the computer 102 may divide the length of the advisory zone into equally sized sections and overlay the advisory zone 250 with a number of indicator symbols 252. Indicator symbols 252 are arranged at equally spaced intervals from the far end 203 such that each indicator symbol 252 visually demarks a section of the advisory zone 250 with respect to other sections and with respect to the remainder of the displayed runway. In various embodiments, the number is less than six, and preferably three. The number is small to provide an intuitive visual indicator of measurement within the advisory zone 250, but without cluttering the respective advisory zone. In FIG. 2, the indicator symbols 252 are depicted as lines that are open in the center of the runway 204 and separated by 1000 feet (i.e., the sections are 1000 feet long); however, the indicator symbols 252 may extend across the runway width, or assume a variety of other forms.

Figure 3:
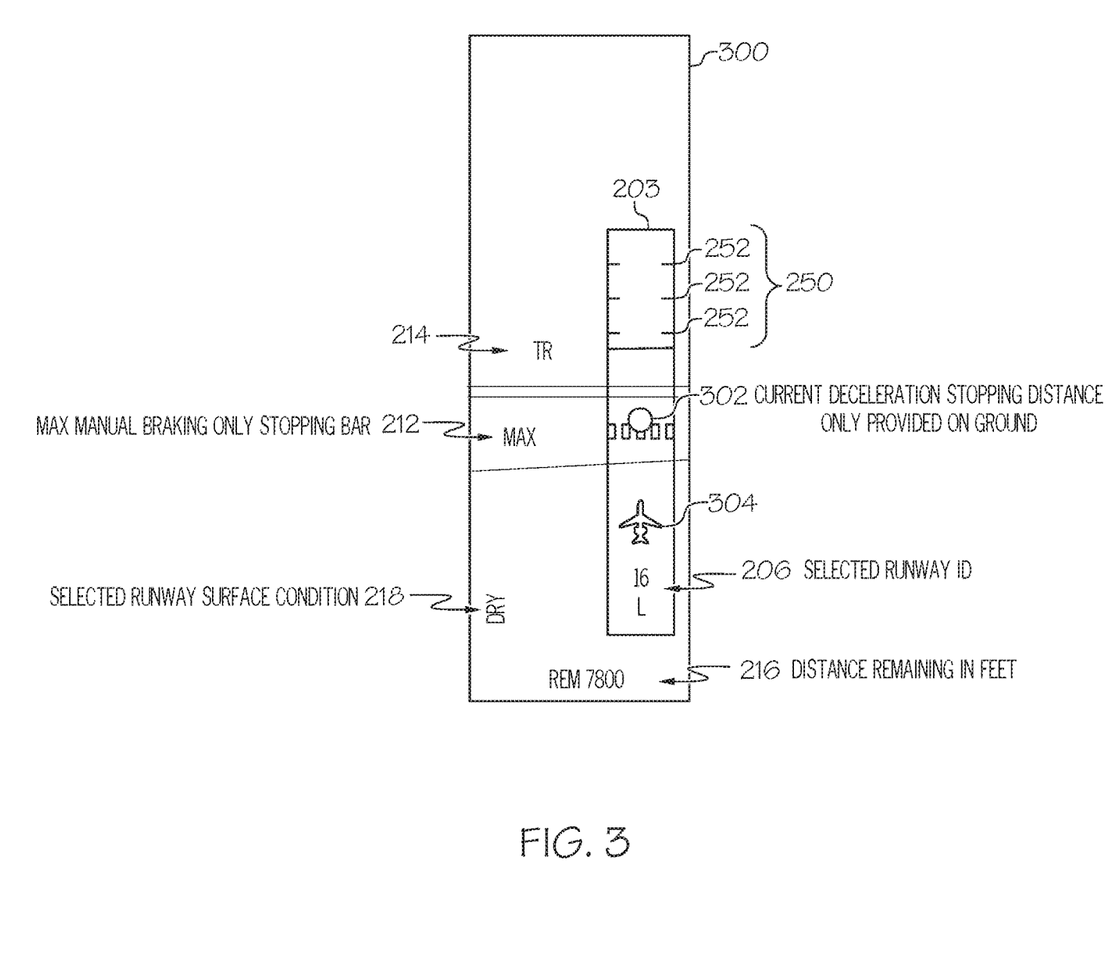

The overrun image 300, depicted in FIG. 3, is an exemplary overrun image for an aircraft on the ground. The predicted touchdown point 208 of FIG. 2 is no longer applicable, and the doughnut symbol used to indicate the predicted touchdown point 208 is replaced by a predicted stopping location symbol 302 (depicted as a ball in three dimensions), for the aircraft 304. The first symbol 212, indicating a maximum manual braking only location (depicted as a dashed line with the text "MAX" next to it) remains displayed in FIG. 3. In the embodiment of FIG. 3, the braking status is thrust reverser only, so the second symbol 214 indicating a stopping location associated with the braking status depicts a thrust reverser only predicted stopping line (depicted as a solid stopping bar with the text "TR" next to it).

Figure 4:
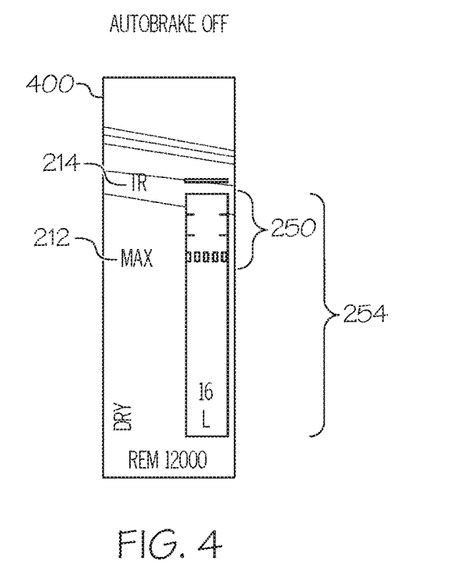
Figure 5:
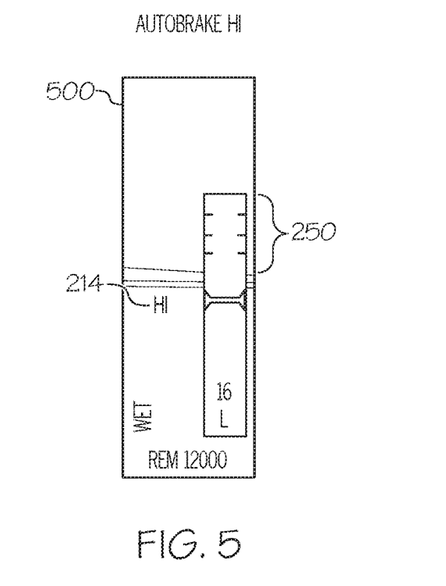
Figure 6:
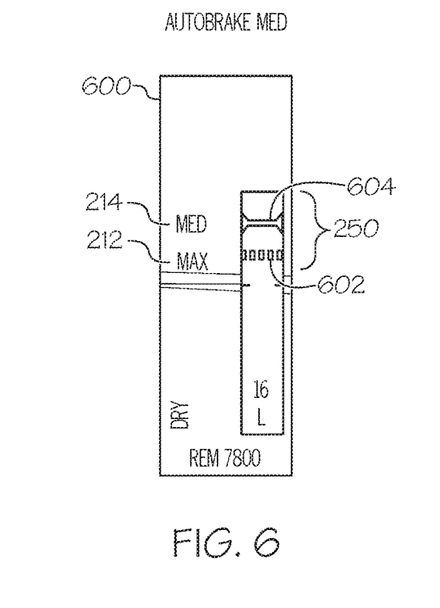
Figure 7:
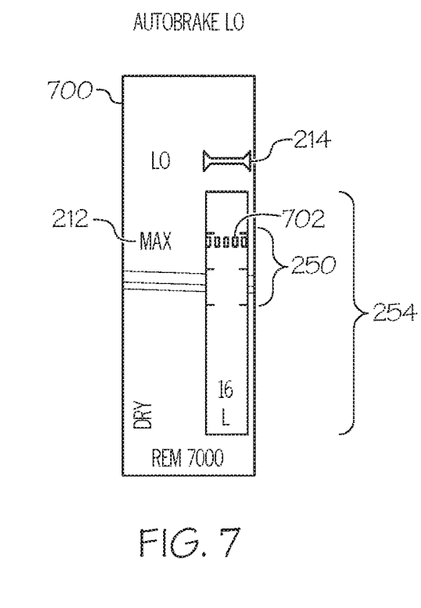

In FIGS. 4-7, various overrun images are depicted, in accordance with the exemplary embodiment. In FIG. 4, and overrun image 400, the second symbol 214 indicates a stopping location associated with the braking status of auto-brake off and only thrust reverser. FIG. 5, and overrun image 500, the second symbol 214 indicates a stopping location associated with the braking status of auto-brake high, in which case, the maximum manual braking stopping location (first symbol 212) is not depicted. In FIG. 6, and overrun image 600, the second symbol 214 indicates a stopping location associated with the braking status of auto-brake on medium (depicted as "MED"). In FIG. 7, and overrun image 700, the second symbol 214 indicates a stopping location associated with the braking status of auto-brake on low (depicted as "LO").

A comparison of FIGS. 4-7 show that in FIG. 4 and in FIG. 7 the braking status of the aircraft 304 will not bring the aircraft 304 to a stop before the aircraft 304 reaches the far end 203 of the runway, however with maximum manual braking 212 the aircraft 304 will be able to stop before the far end 203 of the runway 204. Additionally, in comparing FIG. 4 to FIG. 7, one may observe that maximum manual braking 212 will bring aircraft 304 to a stop near the entry side 256 of the advisory zone 250 in FIG. 4, but near the far end 203 of the runway 204 in FIG. 7 (where the predicted stopping location with maximum manual braking (first symbol 212) is next to the last indicator symbol 702). FIG. 6 is slightly more subtle, showing that either of the maximum manual braking 212 or the designated braking status (auto-brake medium) of the aircraft 304 are predicted to stop the aircraft 304 prior to it reaching the far end 203 of the runway 204; however, the stopping location (first symbol 212) for maximum manual braking is predicted to provide additional margin, being located near the second indicator symbol 602 (approximately ⅔ of the distance before the far end 203) compared to the stopping distance for auto-brake medium, located near the last indicator symbol 604 (approximately ⅓ of the distance before the far end 203).

Considering FIGS. 4 to 7 further, one may readily appreciate that various alerting methods may be utilized to prioritize the overrun scenarios described herein. In various embodiments, the audio system 120 may be employed to emit an aural alert. In addition, color schemes (such as green for safe, yellow for caution, and red for alert) applied to symbology within the overrun image, and/or flashing text may be employed. As a non-limiting example, when the designated braking status is predicted to stop the aircraft 304 prior to a predetermined threshold safety distance measured from the far end 203 of the runway 204, as in FIG. 5, the border of the runway 204 and the indicator symbols 252 may be displayed in green, wherein green is not utilized in the remaining runway segment 254. When utilized this way, the predetermined threshold safety distance may be the entry end of the advisory zone 250, or any other location, measured from the far end 203, that the user arranges via user input. Continuing with the example, the color of the rendering of the border of the runway 204 and the indicator symbols 252 may be changed responsive to determining that the stopping location associated with the braking status is less than the predetermined threshold safety distance (for example, but changing from green to amber, to indicate a cautionary alert, and to red to indicate a warning, each of which represent a percentage (i.e., 30% and 70%) of the predetermined threshold safety distance, measured from the far end 203). In another example, when the maximum manual braking stopping distance (first symbol 212) is in the last ⅔ of the advisory zone, as in FIG. 7, the border of the runway 204 and the indicator symbols 252/702 may be displayed in red, wherein red is not utilized in the remaining runway segment 254. In still another example, the processor 104 may command the display device 112 to change a color of the runway segment 254 when the aircraft 304 is predicted to be unable to stop by the far end 203 of the runway 204.

Figure 8:
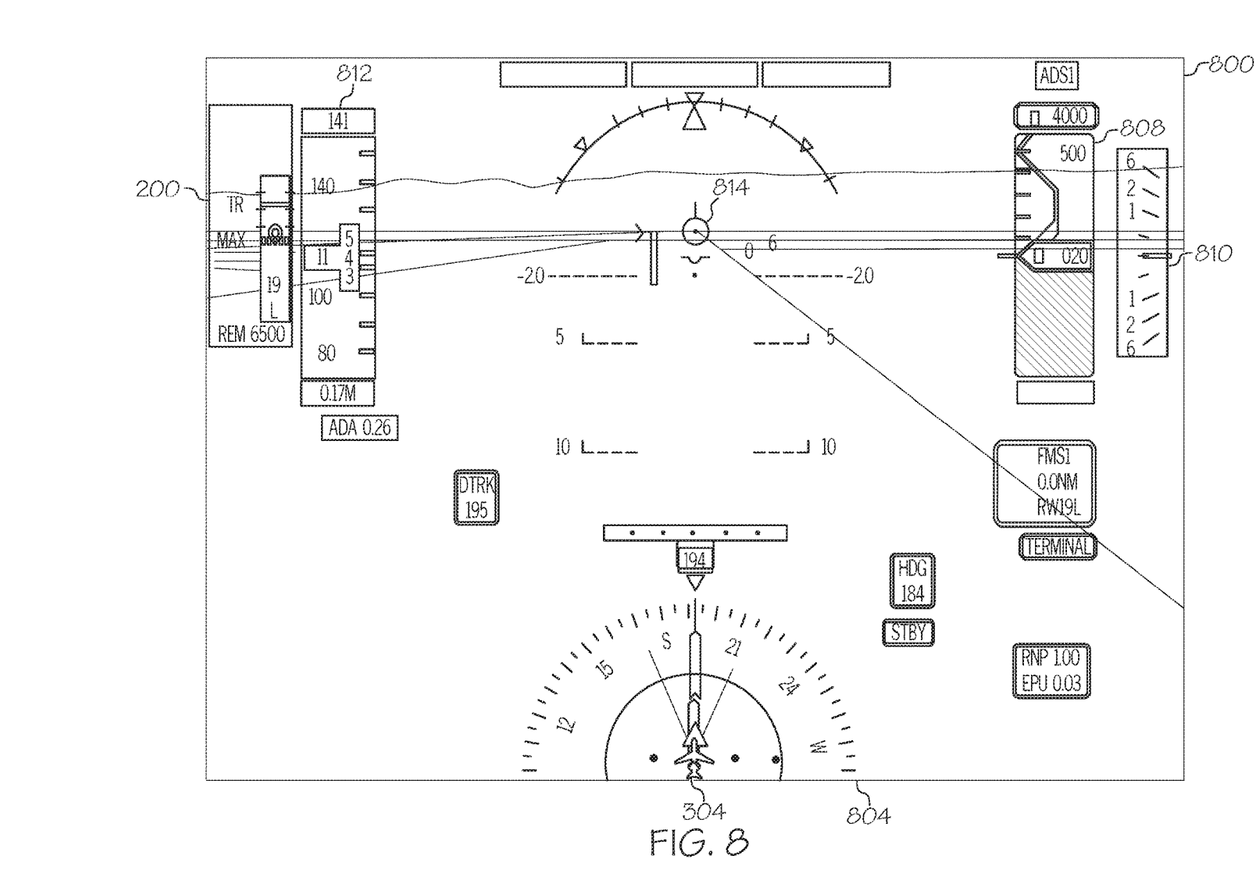

FIG. 8 is an exemplary existing displayed image in the form of three dimensional image 800 from the display device 112, showing a contemplated location for the overrun image 200. As mentioned, the same dedicated area of predetermined height and width is utilized by the computer 102 to generate the overrun image 200 for each braking scenario described herein. Exemplary three dimensional image 800 includes a compass 804, an altimeter 808, a vertical feet-per-minute indicator 810, an airspeed indicator 812, a flight path marker 814, and other information known to those skilled in the art. Additional data (not shown) could also be displayed, and some of those indicators shown in image 800 could be omitted.

Figure 9:
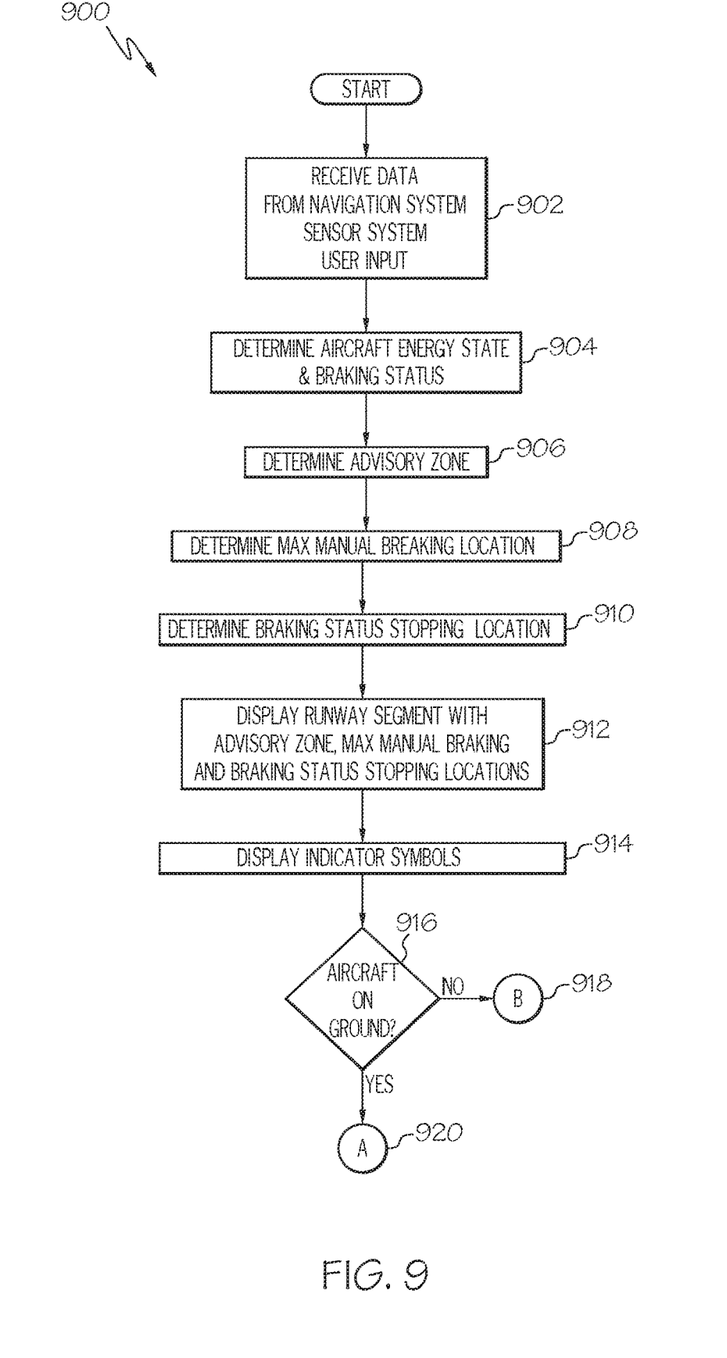
FIGS. 9-10 are flow diagrams of an exemplary method suitable for use with the display system of FIG. 1 in accordance with the exemplary embodiments.
Figure 10:
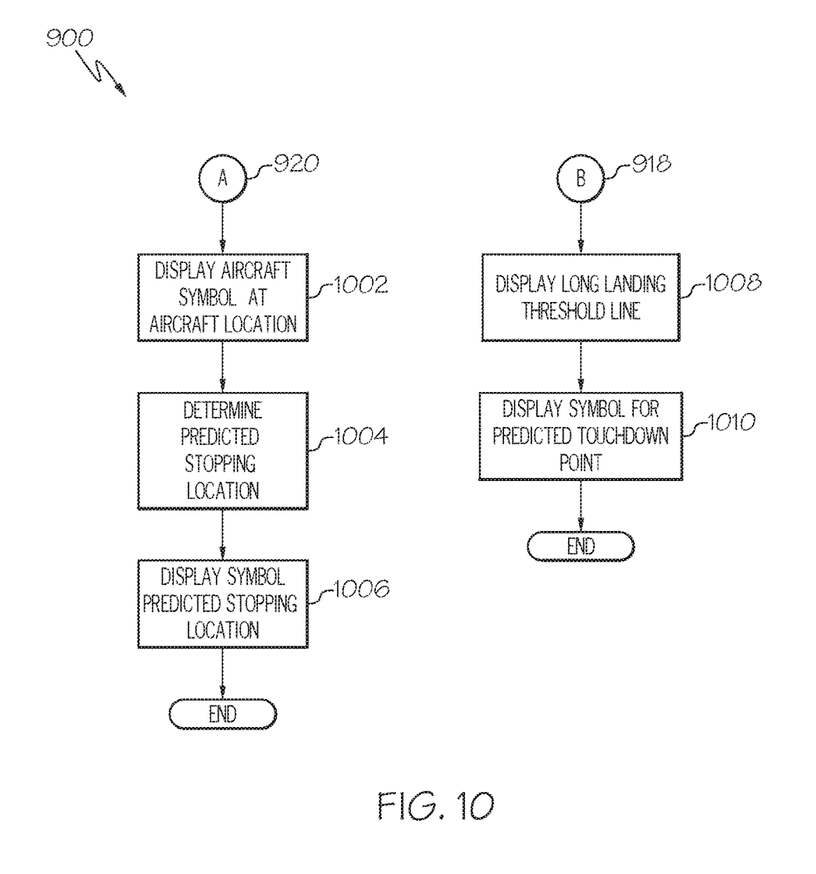

FIG. 9 and FIG. 10 are flow charts for a process that the display system 100 may implement. In the provided embodiment, the computer 102, comprising processor 104 and computer readable storage medium 106, performs process steps. As can be appreciated in light of the disclosure, the order of the process steps is not limited to the sequential execution illustrated in FIGS. 9-10, rather the process steps may be performed in one or more varying orders as applicable, and in accordance with the present disclosure. As can further be appreciated, one or more steps of the process may be added or removed without altering the spirit of the process.

At 902 data is received from systems within the on-board computer system 108. An aircraft position and location is received from the navigation system 118, and a plurality of aircraft status data is received from the sensor system 116. User input, such as the predetermined threshold safety distance, a predetermined length for the advisory zone, and flight path information, may also be received at 902. At 904, the computer processes the aircraft status data and the aircraft position and location to determine an aircraft energy state and a braking status of the aircraft (braking status is defined in connection with FIG. 1). The advisory zone is determined at 906. As previously mentioned, the advisory zone is a final portion of the runway, having a predetermined length measured from the far end 203 of the runway 204, therefore determining the advisory zone includes retrieving the runway 204 data such as orientation and dimensions.

Based on the braking status determined at 904, the aircraft position and location, and aircraft performance data, the process 900 selectively determines at least one stopping location (determination of individual stopping locations depicted at 908, 910 and 1004). At 908 the maximum manual braking stopping location, measured from the far end 203, is determined. In some embodiments, when the braking status is auto-brake high, maximum manual braking stopping location is not determined. At 910, a stopping location for the braking status is determined, as measured from the far end 203.

At 912, the computer 102 commands the display device to overlay the overrun image 200 on the displayed image, such as image 800. If the overrun image 200 is already overlaid on the displayed image 800, it is simply updated at 912. As is described herein, the overrun image 200 may be displayed with symbology representing the runway segment 254, having thereon rendered the advisory zone 250 in a visually distinct manner with respect to the rendering of the remainder of the runway segment 254, and, for each stopping location of the at least one stopping location selectively determined, overlay the runway segment with a unique symbol representative thereof (i.e., one or more of the following: a first symbol 212, indicating the maximum manual braking stopping location; a second symbol 214 indicating the stopping location associated with the braking status of the aircraft 304; and, (1) a third symbol indicating a current predicted stopping location (determined at 1004) and (2) a symbol for the aircraft 304).

The overrun image 200 may also have displayed thereon indicator symbols to visually indicate distances. At 914, the process 900 determines indicator symbols 252 based on the previously determined advisory zone and a number (n) of segments (the number n being user selected or pre-loaded into the computer readable storage medium 106) to divide the advisory zone into. The indicator symbols 252 are overlaid on the advisory zone 250, equally spaced apart from each other, and located at distances measured from the far end 203.

At 916, the aircraft position and location are processed to determine whether the aircraft 304 is on the ground. If the aircraft 304 is on the ground, the process proceeds to 920. If the aircraft 304 is not on the ground, it is still in the air, and the process proceeds to 918. When the aircraft is not on the ground at 918, if the aircraft is on final approach, the process 900 displays a long landing threshold line at 1008, which may involve comparing user input data with previously uploaded flight path data, and referencing one or more databases for airport information. At 1010 the process 900 displays or overlays the overrun image 200 with a symbol for a predicted touchdown point. Alternatively, when the aircraft 304 is determined to be on the ground, the process 900, at 1002, displays a symbol for the aircraft 304 on the overrun image 200 in a location that represents the current location of the aircraft 304. At 1004, the process 900 determines a predicted stopping location, and at 1006, the process displays, or overlays, a symbol indicating a current predicted stopping location.

The system and method described herein improve upon existing aircraft display systems by generating and updating an overrun image 200 that may be displayed in a dedicated area on a variety of panoramic and landscape images on display device 112. Specifically, the improved aircraft display system determines an advisory zone 250 on the selected runway 204 and presents symbols and images in and near the advisory zone 250 that are located with respect to the far end 203 of the selected runway 204.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate the interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a controller or processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A display system for an aircraft, comprising:
   a display device; and
   a computer coupled to the display device, the computer comprising a processor and a computer readable storage medium, the computer configured to:
   receive, from a navigation system, an aircraft position and location;
   receive, from a sensor system, aircraft status data including, heading, altitude, and attitude, airspeed, vertical speed, remaining fuel, faults, conditions, thrust level, and aircraft configuration;
   determine, based on the aircraft status data and the aircraft position and location, (a) an aircraft energy state, and (b) a braking status of the aircraft, wherein the braking status is one of (i) maximum manual braking, (ii) thrust reverser only braking, (iii) maximum manual braking with thrust reverser braking, (iv) auto-brake high, (v) auto-brake medium, or (vi) auto-brake low;
   determine a predetermined length measured from a far end of the runway, defined as an advisory zone; and
   when the braking status is auto-brake high, determine a stopping location;
   when the braking status is not auto-brake high, determine a stopping location for maximum manual braking and a stopping location for the braking status;
   determine a distance remaining to the far end of the runway;
   determine whether the aircraft is on the ground; and
   when the aircraft is on the ground, determine a current deceleration stopping location; and
   command the display device; and
   wherein the display device is responsive to commands from the computer and configured to:
   overlay an overrun image on a displayed image,
   the overrun image having therein symbology representing a runway segment, the runway segment having thereon rendered,
   in a visually distinct manner with respect to a remainder of the runway segment, the advisory zone;
   for each stopping location, overlay the runway segment with a unique symbol representative thereof;
   display, within the overrun image, the distance remaining and
   a surface condition;
   and
   when the aircraft is not on the ground, overlay on the runway segment, a symbol indicating (i) a predicted touchdown point, and (ii) a long landing threshold line, defined as a maximum touchdown point;
   and when the aircraft is on the ground,
   (i) remove the symbol indicating the predicted touchdown point and the symbol indicating the maximum touchdown point, and (ii) display a symbol indicating the current deceleration stopping location.

2. The display system of claim 1, wherein the computer is further configured to
overlay the advisory zone with a number of indicator symbols arranged at equally spaced intervals within the advisory zone, wherein the number is less than six.

3. The display system of claim 1 wherein the computer is further configured to:
change a color of the runway segment when the aircraft is predicted to be unable to stop by the far end of the runway.

4. The display system of claim 1 further comprising an audio system configured to receive commands from the computer and emit sounds and speech responsive thereto, and wherein the computer system is further configured to:
command the audio system to emit an aural alert when it is determined that the aircraft is predicted to be unable to stop before reaching the far end of the runway.

5. The display system of claim 1, wherein the computer is further configured to receive a predetermined threshold safety distance, and render a border of the runway and the indicator symbols in a first color, responsive to determining that the stopping location associated with the braking status of the aircraft exceeds the predetermined threshold safety distance.

6. The display system of claim 5, wherein the computer is further configured to change a color used for rendering the border of the runway and the indicator symbols, responsive to determining that the stopping location associated with the braking status of the aircraft is prior to the predetermined threshold safety distance.

7. A method for a display system onboard an aircraft, the method comprising:
at a computer,
receiving, from a navigation system, an aircraft position and location;
receiving, from a sensor system, aircraft status data including, heading, altitude, and attitude, airspeed, vertical speed, remaining fuel, faults, conditions, thrust level, and aircraft configuration;
determining a length measured from a far end of the runway, defined as an advisory zone;
determining a distance remaining to the far end of the runway;
determining, based on the aircraft status data and the aircraft position and location, (a) an aircraft energy state, and (b) a braking status of the aircraft, wherein the braking status is one of (i) maximum manual braking, (ii) thrust reverser only braking, (iii) maximum manual braking with thrust reverser braking, (iv) auto-brake high, (v) auto-brake medium, or (vi) and auto-brake low; and
when the braking status is auto-brake high, determining a stopping location;
when the braking status is not auto-brake high, determining a stopping location for maximum manual braking and a stopping location for the braking status;
determining whether the aircraft is on the ground; and
generating commands for a display device; and
on a display device, responsive to commands from the computer system,
overlaying an overrun image in a dedicated area of a displayed image;
the overrun image having therein symbology representing a runway segment,
the runway segment having thereon rendered, in a visually distinct manner with respect to a remainder of the runway segment, the advisory zone;
for each stopping location, overlaying the runway segment with a unique symbol representative thereof;
displaying, within the overrun image, the distance remaining; and
a surface condition of the runway; and
when the aircraft is not on the ground, overlaying on the runway segment a symbol indicating (i) a predicted touchdown point, and (ii) a long landing threshold line, defined as a maximum touchdown point; and
when the aircraft is on the ground, determining a current deceleration stopping location, and
commanding the display system to (i) remove the symbol indicating the predicted touchdown point and the symbol indicating the maximum touchdown point, and (ii) display a symbol indicating the current deceleration stopping location.

8. The method of claim 7, wherein the advisory zone is substantially a final third of the runway and the display system is further configured to overlay 3 indicator symbols arranged at equally spaced intervals in the advisory zone.

* * * * *